Patented Jan. 27, 1953

2,626,854

UNITED STATES PATENT OFFICE 2,626,854

PURIFICATION OF CUPROUS OXIDE

Joseph W. Ayers, Easton, Pa., assignor, by mesne assignments, to C. K. Williams & Co., East St. Louis, Ill., a corporation of Delaware No Drawing. Application June 1, 1946, Serial No. 673,891

3 Claims. (Cl. 23—147)

This invention relates to a process for the treatment of cuprous oxide contaminated with zinc oxide, for the purpose of purifying the same.

In accordance with a well known prior process, cuprous oxide is produced on a commercial scale by leaching gilding metal composed of 90% copper and 10% zinc with cupric ammonium carbonate and in such process the zinc is ultimately converted to zinc oxide and remains as such through the subsequent cupric oxide reduction process, producing cuprous oxide containing zinc oxide and traces of other materials as impurities. Although this cuprous oxide product is satisfactory for use in some industrial processes, it is not good for use in others, as for example, in plastic anti-fouling coatings applied to ship bottoms to prevent barnacle growth.

The object of the present invention is to provide a simple, economically operable process for producing a zinc oxide-free cuprous oxide suitable for use in industrial processes calling for pure or substantially pure cuprous oxide.

Broadly considered, the present invention may be said to involve subjecting cuprous oxide containing zinc oxide as an impurity to the action of sulphuric acid at a pH value not less than about 3, until the zinc oxide has reacted with the acid to form zinc sulphate, and thereafter washing out the zinc sulphate.

The operability of this process depends upon the now discovered fact that when sulphuric acid, under weakly acidic conditions (pH value of 3 to 7), is applied to the impure cuprous oxide product, it reacts with zinc oxide but not with cuprous oxide contained in the mixture. The zinc sulphate formed by the reaction, being soluble in water, is easily removed from the treated cuprous oxide. If the pH value of the reaction mass is permitted to fall below 3, reaction with cuprous oxide will occur and hence sulphuric acid concentrations and methods of mixing the sulphuric acid with the impure cuprous oxide must be employed which do not permit sulphuric acid solution of a lower value than 3 to persist in the reaction mass.

The preferred method of accomplishing the reaction involves slowly introducing a dilute sulphuric acid solution (about 20% or less) into a slurry of the impure cuprous oxide during continuous agitation. Although the acid solution itself may be at a pH value below 3, the dilution by the water of the slurry, and the withdrawal of acid by the reaction during the introduction of the acid, will increase the pH to a value within the permissible range. Any other method of bringing together the acid and impure cuprous oxide may be employed providing precautions are taken to maintain the required mild acidic conditions. Furthermore, the purification may be carried out with greater speed at elevated temperatures but the over all gain may not make such variation of the process of any appreciably greater economic value.

Dilute acid solutions are preferably employed, for if this is done the pH value may be more easily controlled such that at no time does it create local areas of excess acidity. Local control of the acidity is also facilitated by agitation of the slurry during the addition of the acid.

Specific example

Two pounds of cuprous oxide containing about 5.5% of zinc oxide were mixed with 1.74 gallons of water to form a slurry. Then during agitation of the slurry and at room temperature, 1050 ml. of a 10% solution of sulphuric acid were added over a period of 21 minutes. The original pH value of the slurry of 7.28 was gradually reduced as additional sulphuric acid solution was added, and at the end of the introduction period, the pH had dropped to 3.03.

The cuprous oxide acid-treated slurry was then filtered and washed free of zinc sulphate and other impurities. In order to dry the material without oxidizing the cuprous oxide to cupric oxide, the water in the washed cuprous oxide cake was displaced with alcohol and the alcohol was displaced with ether, both operations being effected at room temperature.

The success of the purification process of the present invention is brought out in the table below showing the analyses of the cuprous oxide before and after the treatment.

|  | Percent total reducing power | Percent total copper | Percent metallic copper | Percent cupric oxide | Percent cuprous oxide |
|---|---|---|---|---|---|
| Before treating | 95.37 | 84.25 | .24 | .06 | 94.83 |
| After teating | 99.67 | 87.83 | .24 | .11 | 99.14 |

The percent of cuprous oxide and total reducing power in the treated product as shown in the above table indicates that a very pure cuprous oxide substantially free of zinc is obtainable by the process of the present invention.

It should be understood that the present invention is not limited to the specific example or procedure hereinbefore described, but that it extends to all equivalents which will occur to those skilled in the art upon consideration of the scope of the claims appended hereto.

I claim.

1. A process for substantially quantitatively separating both zinc oxide and cuprous oxide from an impure cuprous oxide mass containing a minor amount of zinc oxide which comprises, mixing together said impure cuprous oxide mass and a weakly acidic sulfuric acid solution having a pH value of not less than 3 and selectively reacting the zinc oxide with the sulfuric acid in said solution thereby forming zinc sulfate in the solution and leaving the cuprous oxide as a residue, separating said solution containing substantially none of the copper from the cuprous oxide residue containing substantially none of the zinc.

2. A process for substantially quantitatively separating both zinc oxide and cuprous oxide from an impure cuprous oxide mass containing a minor amount of zinc oxide which comprises, adding a dilute sulfuric acid solution to an aqueous slurry of said impure cuprous oxide mass at a rate which provides and maintains the acidity of the resulting slurry at a pH value of not less than 3 and selectively reacting the zinc oxide with the sulfuric acid of the resulting weakly acidic solution thereby forming zinc sulfate in the solution and leaving the cuprous oxide as a residue, separating said solution containing substantially none of the copper from the cuprous oxide residue containing substantially none of the zinc.

3. A process for substantially quantitatively separating both zinc oxide and cuprous oxide from an impure cuprous oxide mass containing a minor amount of zinc oxide which comprises, forming an aqueous slurry of the said impure cuprous oxide mass, gradually adding a dilute sulfuric acid solution to said slurry during constant agitation at a rate which creates and maintains during the ensuing reaction a weakly acidic reaction mass having a pH value above 3, continuing the introduction of said acid solution until the pH value of the reaction mass approaches 3 and the zinc oxide has been selectively reacted with the sulfuric acid thereby forming zinc sulfate in the solution and leaving the cuprous oxide as a residue, separating said solution containing substantially none of the copper from the cuprous oxide residue containing substantially none of the zinc.

JOSEPH W. AYERS.

REFERENCES CITED

The following references are of record in the file of this patent:

UNITED STATES PATENTS

| Number | Name | Date |
|---|---|---|
| 203,849 | Parnell | May 21, 1878 |
| 1,104,922 | Parish | July 28, 1914 |
| 1,255,440 | Laist | Feb. 5, 1918 |
| 1,343,619 | Elton et al. | June 15, 1920 |
| 1,426,703 | Avery et al. | Aug. 22, 1922 |
| 1,906,074 | Mertes | Apr. 25, 1933 |
| 2,273,708 | Hurd | Feb. 17, 1942 |

FOREIGN PATENTS

| Number | Country | Date |
|---|---|---|
| 24,238 of 1905 | Great Britain | Nov. 23, 1906 |